June 4, 1929. W. S. TURNER 1,715,523

FLOOR COVERING FOR AUTOMOBILES AND THE LIKE

Filed July 27, 1925

INVENTOR.
William S. Turner
BY
Fay, Oberlin & Fay
ATTORNEYS.

Patented June 4, 1929.

1,715,523

UNITED STATES PATENT OFFICE.

WILLIAM S. TURNER, OF DETROIT, MICHIGAN, ASSIGNOR TO THE PAINE AND WILLIAMS COMPANY, OF CLEVELAND, OHIO, A CORPORATION OF OHIO.

FLOOR COVERING FOR AUTOMOBILES AND THE LIKE.

Application filed July 27, 1925. Serial No. 46,207.

The use of rubber matting as a floor covering for automobile bodies while more or less general in the case of open cars has never been regarded as satisfactory in the case of closed bodies, which are usually upholstered in fabric instead of leather or leather substitutes. The effect, in other words, of the ordinary solid rubber mat in a closed car thus upholstered in the prevailing manner is unsatisfactory, both from the standpoint of appearance and comfort. On the other hand, the use of carpeting is equally objectionable, although for different reasons, the principal one being that such carpet, even when of the best grade, wears rapidly and unevenly so that it presently becomes unsightly, and in the second place it is difficult to clean such carpet from dust, etc., which it accumulates, as well as to remove the grease stains that unavoidably occur.

The object of the present invention accordingly is to provide an improved form of floor covering that, while retaining an impervious rubber surface to take the wear and permit of easy cleaning, will combine therewith the softness and comfort of the best grade of carpet. The present floor covering, in other words, has been found in actual practice a satisfactory substitute for rugs even in finely appointed sedans and limousines.

To the accomplishment of the foregoing and related objects, said invention, then, consists of the means hereinafter fully described and particularly pointed out in the claims, the annexed drawing and the following description setting forth in detail certain structure embodying the invention, such disclosed means constituting, however, but one of various structural forms in which the principle of the invention may be used.

In said annexed drawing:—

Figure 1:
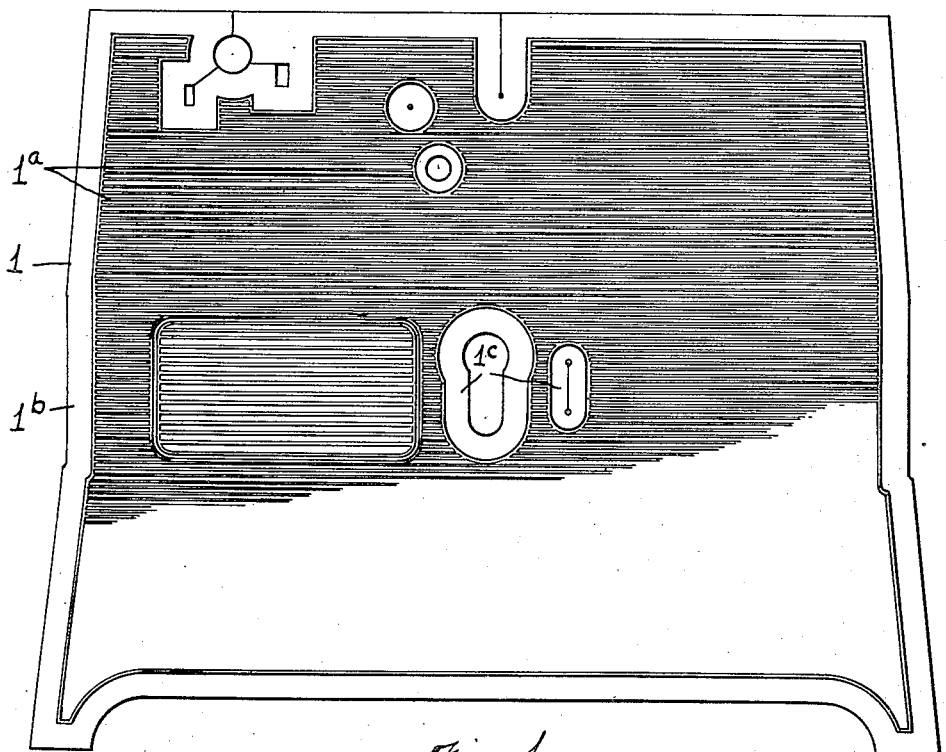
Figure 2:
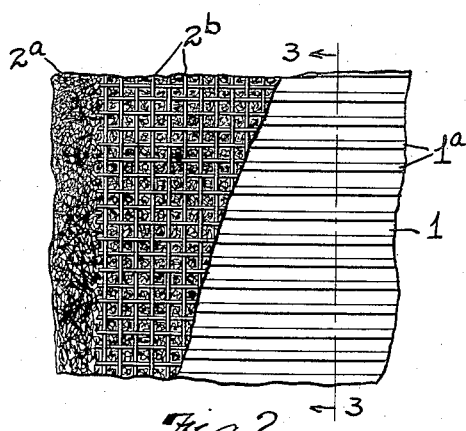

Fig. 1 is a plan view of a floor mat constructed in accordance with my present improvements, the mat chosen for the purpose of illustration being specifically intended for the front or driving compartment of an automobile body; Fig. 2 is a plan view on a larger scale of a portion of such covering, the layers composing the same being broken away so as better to illustrate the construction; and Fig. 3 is a vertical section thereof, the plane of the section being indicated by the line 3—3, Fig. 2.

As previously indicated the upper or wearing surface of my improved floor covering consists of an impervious layer 1 of rubber. The composition of such layer and the degree of vulcanization to which it is subjected are substantially the same as in the case of ordinary rubber matting, although it may be preferable in some cases to leave such layer somewhat softer and correspondingly more flexible. The upper surface of said layer of vulcanized rubber may be formed with ribs $1^a$ or with ornamental designs of any desired character, and in the case of a mat designed to fit a specific floor space such layer will be formed with a border $1^b$ extending along the respective edges of the mat, as well as with a similar border about the openings where required for the passage through the mat of operating levers and the like that form a part of the automobile driving mechanism.

Figure 3:
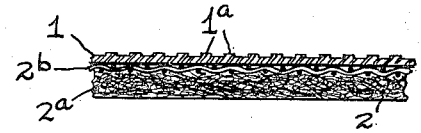

In the process of manufacture, such layer of rubber is preferably vulcanized directly to one face of a felted pad 2, as clearly shown in Fig. 3, although it has also been found satisfactory to attach the layer of rubber to the pad by means of a suitable cement preferably a so-called rubber cement. The material of this pad may vary, but it will be preferably composed of fine fibers loosely interwoven or otherwise compacted together so as to provide a resilient foundation for said rubber layer, the thickness being sufficient to give a soft carpet feel when such rubber layer is trod upon.

A very satisfactory material for such supporting or body layer of the mat is so-called hair felt, which is made from the hair of cattle, or like animal, the hair being formed into a layer $2^a$ of the desired thickness and held together by the inclusion of a sheet $2^b$ of fabric of open weave, such as burlap, netting or the like. Preferably the layer of hair is stitched to such fabric sheet either by passing threads through the two, or by punching the layer of hair at intervals through the sheet of fabric so as to cause the two to adhere together in more or less permanent fashion.

Preferably, although not necessarily, where a felt layer of the construction last described is employed as the base of my improved floor covering, the sheet $2^b$ of fabric is left exposed on one side of such layer, viz, the side to which the layer 1 of rubber is applied. Accordingly when such layer, in its prevulcanized state, is pressed onto the pad 2, and similarly where the two are united by means of a suitable rubber cement, the rubber layer is caused to adhere to the strands composing such sheet of fabric, and when the vulcanization operation is completed, or the volatile constituent of the cement has evaporated, a firm bond is established with such fabric, and thus with the felted base in its entirety. However, the rubber layer may be similarly pressed on, and directly vulcanized or cemented to, the felted pad of hair, if desired.

A floor covering or mat made in accordance with the foregoing description has all of the desirable characteristics of a rubber mat in that it does not absorb moisture or retain grease stains, and is impervious to drafts. At the same time the felt layer affords an admirable insulation against hot or cold air which otherwise tends to rise through the floor, particularly in the front or driving compartment of an automobile, and the passage of noise from below is also effectually prevented. From the standpoint of the user's comfort my improved covering has all the softness of a heavy carpet, and where the surface of the rubber layer is formed with an artistic design and of a color to match the upholstery, a floor covering of this type is eminently satisfactory for use in the most luxuriously finished type of automobile body.

Other forms may be employed embodying the features of my invention instead of the one here explained, change being made in the form or construction, provided the elements stated by any of the following claims or the equivalent of such stated elements be employed.

I therefore particularly point out and distinctly claim as my invention:—

1. A floor covering flexible throughout comprising a loosely-compacted fibrous base, an upper wearing-surface layer of molded and contoured vulcanized soft rubber, and an intermediate layer of fabric joining between said surface layer and said base, said fabric being stitched to said base.

2. A floor covering flexible throughout comprising a loosely-compacted hair base, an upper wearing-surface layer of molded and contoured vulcanized soft rubber, and an intermediate layer of fabric joining between said surface-layer and said base, said fabric being stitched to said hair base.

3. A floor covering or the like, flexible throughout, comprising a loosely-compacted fibrous base, and an upper wearing-surface layer of flexible, vulcanized rubber, said base including a layer of fabric stitched thereto.

Signed by me this 20 day of July, 1925.

WILLIAM S. TURNER.